US008484493B2

(12) United States Patent
Lambert et al.

(10) Patent No.: US 8,484,493 B2
(45) Date of Patent: Jul. 9, 2013

(54) METHOD FOR PRE-CHASSIS POWER MULTI-SLOT BLADE IDENTIFICATION AND INVENTORY

(75) Inventors: Timothy M. Lambert, Austin, TX (US); Kalyani S. Gamare, Austin, TX (US)

(73) Assignee: Dell Products, LP, Round Rock, TX (US)

(*) Notice: Subject to any disclaimer, the term of this patent is extended or adjusted under 35 U.S.C. 154(b) by 609 days.

(21) Appl. No.: 12/290,324

(22) Filed: Oct. 29, 2008

(65) Prior Publication Data

US 2010/0106987 A1  Apr. 29, 2010

(51) Int. Cl.
*G06F 1/26* (2006.01)
*G06F 1/00* (2006.01)
*G05B 11/01* (2006.01)
*G05D 3/12* (2006.01)

(52) U.S. Cl.
USPC ............. 713/320; 713/330; 713/340; 700/22; 700/295; 700/297

(58) Field of Classification Search
USPC .................... 713/320, 330, 340, 300; 700/22, 700/295, 297
See application file for complete search history.

(56) References Cited

U.S. PATENT DOCUMENTS

| | | | |
|---|---|---|---|
| 6,661,671 B1 | 12/2003 | Franke et al. | |
| 6,748,510 B1 * | 6/2004 | Coatney | 711/170 |
| 6,903,659 B2 * | 6/2005 | Vanderah et al. | 340/636.1 |
| 6,968,414 B2 | 11/2005 | Abbondanzio et al. | |
| 7,082,528 B2 * | 7/2006 | Zaudtke et al. | 713/2 |
| 7,353,415 B2 * | 4/2008 | Zaretsky et al. | 713/320 |
| 7,383,454 B2 * | 6/2008 | Loffink et al. | 713/300 |
| 8,166,330 B2 * | 4/2012 | Pickholz et al. | 713/330 |
| 2002/0133695 A1 * | 9/2002 | Khatri et al. | 713/1 |
| 2003/0191877 A1 * | 10/2003 | Zaudtke et al. | 710/72 |
| 2004/0059903 A1 * | 3/2004 | Smith et al. | 713/1 |
| 2005/0283624 A1 * | 12/2005 | Kumar et al. | 713/300 |
| 2006/0140211 A1 | 6/2006 | Huang et al. | |
| 2007/0019626 A1 | 1/2007 | Lahiri et al. | |
| 2007/0143635 A1 | 6/2007 | Hughes et al. | |
| 2007/0150761 A1 * | 6/2007 | Beyer et al. | 713/300 |
| 2007/0260896 A1 * | 11/2007 | Brundridge et al. | 713/300 |

(Continued)

OTHER PUBLICATIONS

McGary, "Exploring the Idrac for Dell Poweredge Blade Servers", Dell Power Solutions, May 2008, 4 pgs.

(Continued)

*Primary Examiner* — Kavita Padmanabhan
*Assistant Examiner* — Darrin Dunn
(74) *Attorney, Agent, or Firm* — O'Keefe, Egan, Peterman & Enders LLP

(57) ABSTRACT

Systems and methods for a blade server to obtain the blade type and configuration of the chassis without requiring the blades to be fully powered. Using this method the user has the ability to acquire correct inventory and slot status of the chassis through the use of a low power auxiliary power state. The user is then able to apply the proper power budgeting and thermal algorithm requirements utilizing this information while minimizing the power consumption necessary to acquire such information. In addition, an intelligent search algorithm may be utilized to scan the blades for blade information thus further minimizing power consumption and decreasing the time needed to inventory the blades.

15 Claims, 3 Drawing Sheets

U.S. PATENT DOCUMENTS

| | | | |
|---|---|---|---|
| 2008/0081618 A1* | 4/2008 | Krantz et al. | 455/434 |
| 2008/0313476 A1* | 12/2008 | Hansen | 713/300 |
| 2009/0210735 A1* | 8/2009 | Brown et al. | 713/330 |
| 2009/0222677 A1* | 9/2009 | Astigarraga et al. | 713/300 |
| 2011/0055476 A1* | 3/2011 | Christ | 711/114 |
| 2011/0161482 A1* | 6/2011 | Bonola et al. | 709/223 |

OTHER PUBLICATIONS

Khatri et al., "System and Method for Delaying Power-Up of an Information Handling System", DC-13663, Filed Jun. 10, 2008, U.S. Appl. No. 12/136,420, 26j pgs.

* cited by examiner

METHOD FOR PRE-CHASSIS POWER MULTI-SLOT BLADE IDENTIFICATION AND INVENTORY

TECHNICAL FIELD

This invention relates to the operation of blades within blade servers and, more particularly, to the identification and configuration of blades within a blade server chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are implemented as multiple processing components configured as part of a single system. A "blade" is a general term often used to refer to one component in a system that is designed to accept some number of components. Blades can be, for example, individual servers that plug into a single cabinet or chassis or individual port cards that add connectivity to a switch. Blades are often hot swappable hardware devices. A "blade server" is a general term often used to refer to system architecture those houses multiple server modules or blades in a single chassis. Blade servers are widely used, for example, in data centers to save space and improve system management. Either self-standing or rack mounted, the chassis provides the power supply, and each blade often may have its own CPU, memory and hard disk. Redundant power supplies may also be provided. Blade servers generally provide their own management systems and may include a network or storage switch or other components. With enterprise-class blade servers, disk storage is often external, and the blades are diskless. This approach allows for more efficient fail-over techniques because applications are not tied to specific hardware and a particular instance of the operating system. In such a solution, the blades are typically anonymous and interchangeable.

In the modular server market, there are a variety of blade types that service various market segments including small general purpose, double high, double wide and quad blades (which are double high and double wide). These various blade types may occupy one or more slots in a chassis. The actual number of blades in a chassis is dependent upon the type of blades. Also, the different blade types can be inserted in any combination in the modular server chassis, for example, a 2×8 (double high and eight wide) slot chassis. In the prior art, the blade hardware typically only relays to the chassis controller blade presence and power state. The chassis controller displays the inventory and blade slot population status based on this signal alone. Any time the blade power of the chassis is generally powered OFF, in this case meaning that the blades are not powered but that the chassis controller board may still be powered for other chassis controller functionality, the chassis controller has no method to determine the type of the blade. The chassis controller then reports each consumed slot as a separate independent entity, even for multi-slot blades which have a primary/master slot in which all control is achieved and one or more secondary/slave slots. This erroneous information causes incorrect inventory and a lack of ability to communicate with the hypothetical blades. This problem can only be corrected by turning the chassis blade power fully ON. This creates customer dissatisfaction because blade type recognition and configuration is dependent on the chassis blade power state, which consumes excess power and generates excess heat.

SUMMARY

The present disclosure provides systems and methods for a blade server to obtain the blade type and configuration of the chassis without requiring the blades to be fully powered. Using this method the use has the ability to acquire correct inventory and slot status of the chassis through the use of a low power auxiliary power state. The user is then able to apply the proper power budgeting and thermal algorithm requirements utilizing this information while minimizing the power consumption necessary to acquire such information. In addition, an intelligent search algorithm may be utilized to scan the blades for blade information thus further minimizing power consumption and decreasing the time needed to inventory the blades.

In one embodiment, the present disclosure provides methods for minimizing blade power ON time during the chassis controller scan technique. By reducing the full blade chassis power ON time during the probe of the blade chassis, the customer is able to also reduce excess power consumption and heat generated. This blade scan technique is achieved utilizing a low power handshake. The scan technique performs a blade-by-blade inventory of the entire chassis in order to determine the chassis pre-power inventory. As described below, other features and variations can be implemented, if desired, and related systems can be utilized, as well.

In another embodiment, the techniques disclosed within allows the chassis controller to differentiate between a low-level blade probing inventory and a normal full blade chassis power on event, so that the chassis controller is able to hold the system from booting up. By preventing the system from booting up, power consumption is minimized. As described below, other features and variations can be implemented, if desired, and related systems can be utilized, as well.

In another embodiment, a method of inventorying the blades of a blade chassis is provided. The method may include providing low power auxiliary power to at least a first blade within the blade chassis, the low power auxiliary power being less than the normal power utilized to operate the blade. The method may further include selectively powering a portion of the blade in a low power state, the portion of the first blade being sufficient to communicate information regarding the first blade to at least one chassis system component. The method may further include communicating the first blade information to the at least one chassis system component while the low power auxiliary power is provided to the first blade.

In still another embodiment a method of operating an information handling system which comprises a plurality of blade components and a chassis controller is provided. This method may include obtaining pre-set information handling system limitations and providing low power auxiliary power to the plurality of blade components within the information handling system. The method may further include selectively powering only a portion of the component in a low power state, the portion of the component being sufficient to communicate information regarding the first component to a chassis controller, and communicating the first component information to the chassis controller while the low power auxiliary power is provided to the first blade. The method further includes scanning a plurality of the blades component while low power auxiliary power is provided to the plurality of blade components to identify blade information and selectively bypassing the scanning of at least one of the blade components of the information handling system based upon the information regarding the information handling system limitations.

In yet another embodiment, an information handling system is provided. The system includes a blade server chassis and a chassis controller within the blade server chassis. The system further includes a plurality of server blades coupled to the chassis controller, the server blades having a low power mode to operate the blade under less than normal power, the low power mode providing power to components of the blade sufficient to provide blade configuration information to the chassis controller. In the system, the configuration information allows the chassis controller to identify and inventory the server blades present in the blade server chassis.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present disclosure provides a solution to obtain blade type and blade configuration regardless of the main chassis power state. This solution provides the customer with correct inventory, slot status and it also invokes the proper power budgeting and thermal algorithm requirements. The chassis controller utilizes a scan technique to probe the blades for the blade information. The information provided by the blade may include blade type, size, configuration, number of CPUs and/or other information. It will be recognized that the concepts disclosed herein are not limited to any particular type of status information communicated to the chassis controller by the blade. This pre-chassis inventory is an important benefit to customers, by preventing potential issues such as not allocating enough Power Supply Units (PSU) for the blade chassis.

Figure 1:
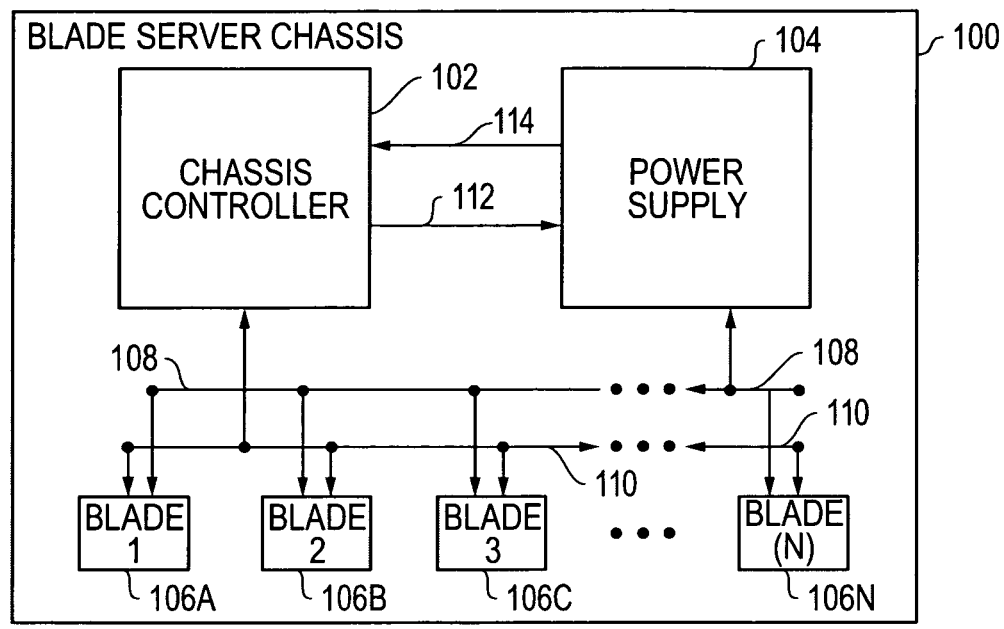
FIG. 1 is a block diagram for a blade array chassis including a chassis controller and a power supply.

FIG. 1 is a block diagram for a blade array chassis 100, which is comprised of a chassis controller 102, a plurality of blades 106A, 106B . . . 106(N), and a power supply 104. The chassis 100 can be configured to accept a plurality of blades, as represented by BLADE1 106A, BLADE2 106B . . . BLADE (N) 106(N). In addition to the chassis controller 102, the chassis 100 can include a chassis power supply 104 that is coupled to the chassis controller 102 utilizing power supply line 114. The chassis controller 102 utilizes control line 112 to exercise power supply 104 ON/OFF. As depicted, power is provided to the blades 106A, 106B, 106C . . . 106(N) from the power supply utilizing connection 108. The chassis controller 102 can communicate with the blades 106A, 106B 106C . . . 106(N) through the communication channel 110. It is noted that any of the blades 106A, 106B . . . 106(N) can be implemented using a wide variety of architectures and configurations.

Figure 2:
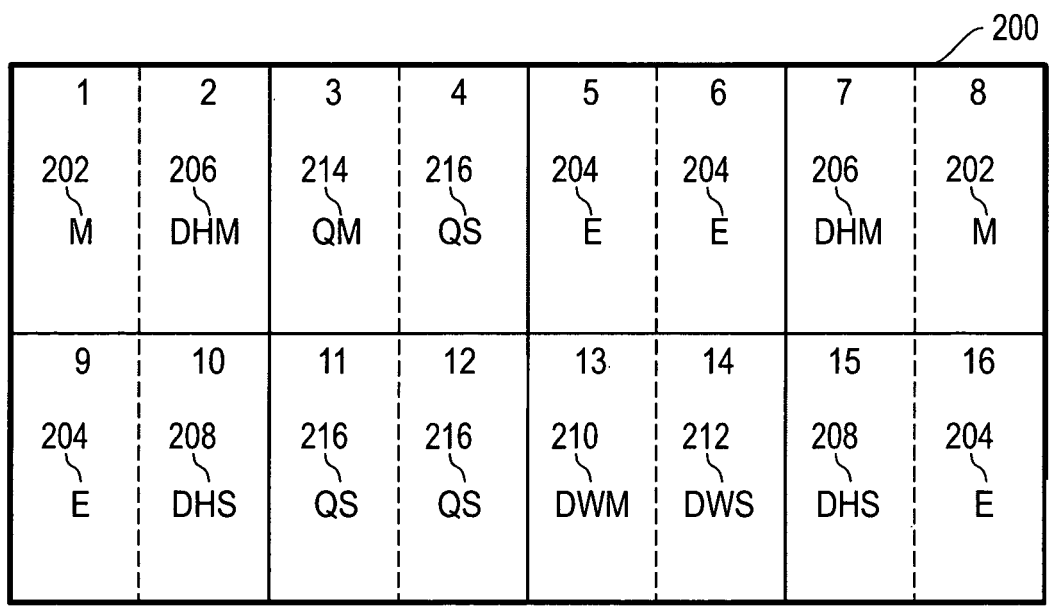
FIG. 2 is an example of a mixed blade size configuration in a blade chassis.

FIG. 2 is an example of a mixed blade size configuration in a 2×8 slot modular server chassis 200. In this configuration there are two rows of eight slots. The chassis 200 is further divided into four quad walls, denoted by the bold boundary lines. The chassis limitations include that a master in a multi-slot blade is always in the upper location of a double high blade or upper-left location of a quad wall for a quad blade. Also, the multi-slot blades may not cross the quad walls. In the example, blade locations 1 and 8 have master blades 202 while blade locations 5, 6, 9 and 16 are empty blade locations 204. The blade location 2 is occupied by the master 206 of a double height blade, whose slave 208 is located in blade location 10. Similarly, blade locations 7 and 15 represent another double height blade. The blade location 3 is occupied by the master 214 of a quad master blade and the corresponding quad slaves 216 occupy blade locations 4, 11 and 12. The blade location 13 is occupied by the master 210 of a double-wide blade and the corresponding slave 212 of the double-wide blade resides in location 14. The chassis 200, as shown, is just one exemplary configuration of blades in a chassis. It will be recognized that the concepts described herein could be used with any size chassis. As such, the term chassis is not limited to the particular configuration shown. In addition, master-slave combinations of blades are not limited to double high, double wide or quad configurations, but rather any type of desired combination could be used.

An example blade slot scan order may be described with reference to FIG. 2. FIG. 2 is an example of a mixed blade size configuration in a blade chassis where the exemplary blade scan order may be: (step 1) blade location 1 is detected as a single master, (step 2) blade location 2 is detected as a double high master, (step 3) blade location 3 is detected as a quad master, (step 4) blade location 4 is skipped as part of slot 3, (steps 5 and 6) blade locations 5 and 6 are empty with no active probe, (step 7) blade location 7 is detected as a double high master, (step 8) blade location 8 is detected as a single master, (step 9) blade location 9 is empty with no active probe, (step 10) blade location 10 is skipped as part of slot 2, (steps 11 and 12) blade locations 11 and 12 are skipped as part of slot 3, (step 13) blade location 13 is detected as a double wide master, (step 14) blade location 14 is skipped as part of slot 13, (step 15) blade location 15 is skipped as part of slot 7 and (step 16) blade location 16 is empty with no active probe. In the example embodiment 200 depicted, it should be noted that there are blade chassis limitations. One being that multi-slot blades may not cross-bold quad walls. Another limitation being that a master in a multi-slot blade is always in the upper-left blade location within a quad wall. Other blade chassis limitations may exist and those shown herein are exemplary. The technique described herein may allow the pre-existing knowledge of the blade chassis limitations and possible configurations to be utilized in order to more efficiently scan the chassis. Such as, for example, scan certain slots first and/or skipping certain slots.

In the present disclosure, full blade power to the blade chassis is not essential in order to inventory blade type and blade configuration. When full blade power to the blade chassis is turned ON, a typical system may utilize on the order of 375 watts for a single height chassis and 600 watts for a double height chassis. However, as disclosed herein, a low power auxiliary mode may be utilized to inventory the blade chassis. In the auxiliary mode disclosed herein, only approximately 12.5 watts of power is necessary to power the chassis controller to perform the inventory of the blade chassis and other chassis non-blade hardware tasks (25 watts is redundant chassis controllers are used). Only one watt of power is needed per blade to inventory a blade chassis with sixteen slots. In one embodiment, the chassis controller 102 may provide control signals such that the power supply supplies auxiliary power to the blades, one blade at a time, utilizing a low power handshake before turning the blade back OFF. Thus using the incremental scanning technique described herein in which only one blade is active at a time, only 13.5 watts of power are consumed by the blades at any given time to perform the inventory task.

Figure 3:
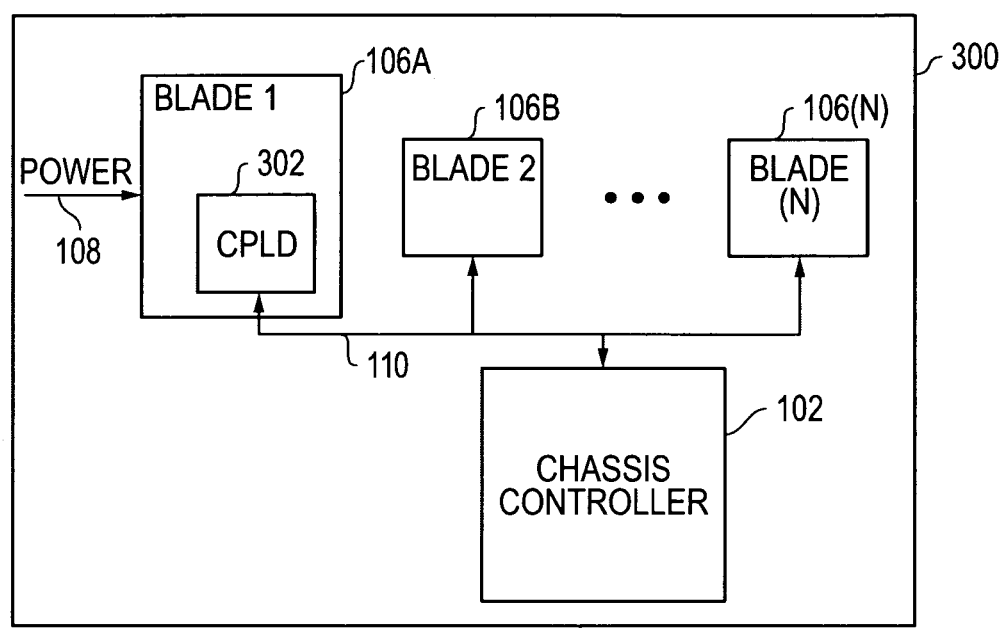
FIG. 3 is a diagram of a blade size scanning support hardware.

FIG. 3 is a diagram of a blade size scanning support hardware 300, which allows the chassis controller 102 to selectively take blade inventory using a low power handshake. When low power auxiliary power 108 is applied to the blade 106A, the blades' complex programmable logic device (CPLD) 302 initializes and begins to transmit inventory information. The blade complex programmable logic device 302 holds the auxiliary logic in rest and holds the main powered logic unpowered to prevent booting and minimize power consumption. The blade complex programmable logic device 302 then transmits blade size inventory to the chassis controller 102 through bus 110. In one exemplary embodiment bus 110 may be time division multiplex shifty serial bus. The bus 110 may communicate between the CPLD and a time division multiplexer controller within the chassis controller. In the exemplary embodiment the bus 110 may be a bus that is typically available in prior art systems for providing out of band low level communication interfaces for various system communications such as alerts, power down, or other hardware control features. In this manner a hardware control status bus may also be utilized during low power operations to provide blade information to the chassis controller.

When low power auxiliary power is provided to the blade, the CPLD initializes and begins participating in the bus 110 to provide information to the chassis controller. In this manner, minimal logic is powered up by the auxiliary power and this minimal logic is utilized to power sufficient operations to provide blade configuration and status information to the chassis controller. The chassis controller 102 gets interrupted by the communication bus 110 and registers the blade geometry and configuration provided from the blade. The chassis controller 102 then turns the auxiliary power OFF to the blade slot and moves on to the next appropriate slot, thereby scanning the entire chassis and determining the pre chassis power inventory.

In FIG. 3, the blade size scanning support hardware 300 is utilized to inventory blade type. In this present disclosure, the chassis controller 102 initiates the blade type probe under certain circumstances. For example, blade type probe is instated when power to the blade chassis is first turned ON and the chassis controller 102 boots up. Probing may also be initiated when the blade chassis is in a state in which the blade power is OFF and a blade is detected as inserted. In such a case, only the inserted blade slot(s) need to be scanned again. Also, the blade type probe may be initiated when the chassis controller 102 becomes active as a result of a chassis controller reset. Blade type probing may occur at other times and the examples given herein are not meant to be limiting.

Figure 4:
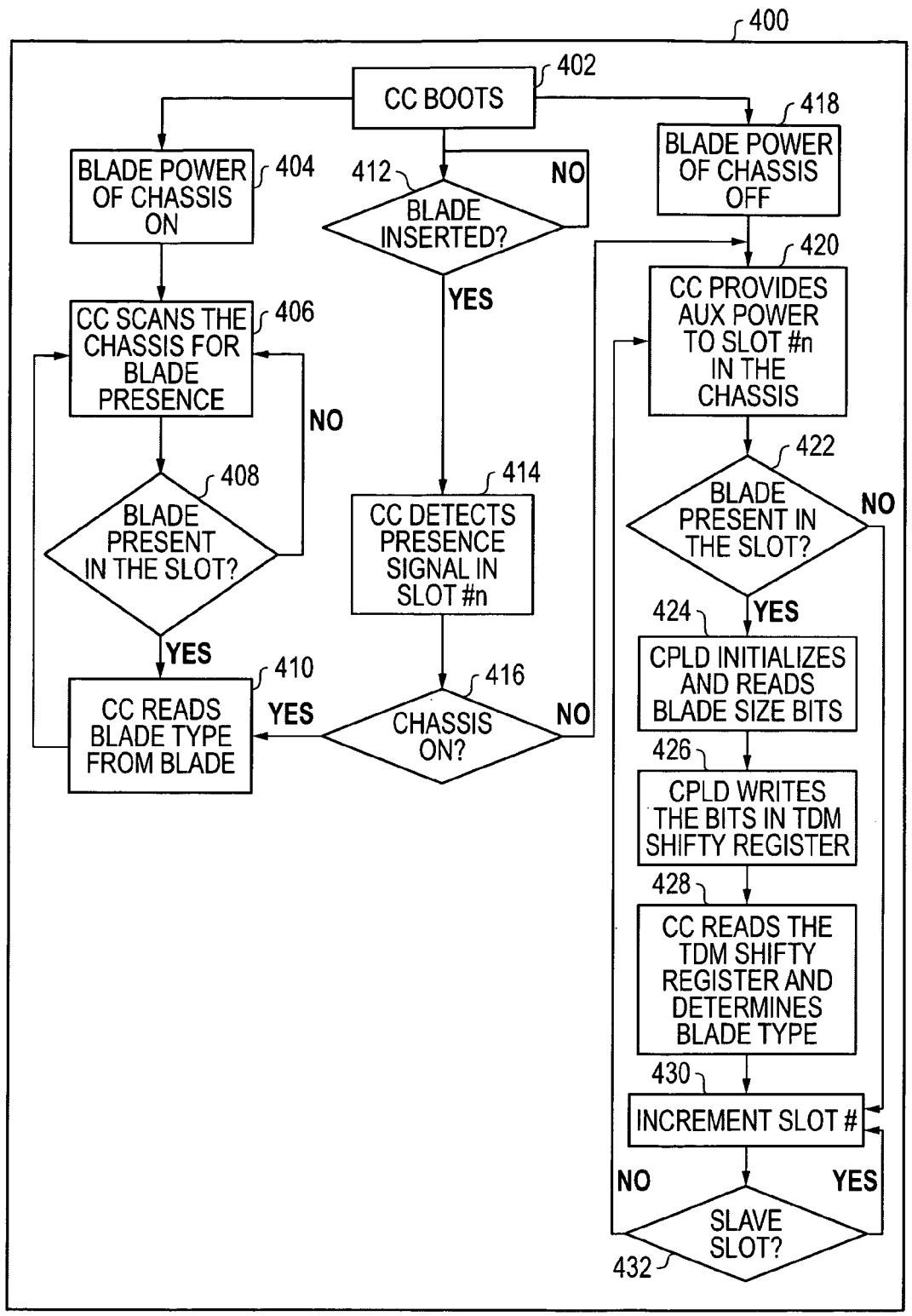
FIG. 4 is a flow diagram for blade type inventory procedure in a blade chassis.

FIG. 4 is a detailed flow diagram for blade type inventory in a blade chassis. In the embodiment 400 depicted, it is assumed that a blade server chassis 100 is configured to accept a maximum of N blades total. The process flow begins with block 402, where the chassis controller boots up and determines if the blade power of the chassis is ON or OFF. If it is determined that the blade power of the chassis 100 is ON, as in block 404, then the flow moves to block 406 where the chassis controller 102 scans the blade chassis for blade presence. Then the flow proceeds down to decision block 408, where it is determined if a blade is present in the slot. If the answer to block 408 is "NO", then the flow moves back up to block 406 where the chassis controller 102 scans the blade chassis for blade presence again. If the answer to block 408 is "YES", then the flow proceeds to block 410, where the chassis controller reads the blade type from the blade. The flow then moves back up to block 406, where the chassis controller 102 scans the blade chassis for blade presence and the procedure is repeated again until all blades are read.

When the chassis controller boots up in block 402 and it is determined that the blade power of chassis 100 is OFF, as in block 418, then flow proceeds in the following manner. The flow passes on to block 420 where the chassis controller 102 provides auxiliary power to slot (N) in the blade chassis. In decision block 422, determination is made if a blade is present in the slot. If the answer in block 422 is "NO", then the flow passes down to decision block 432. If the answer in block 422 is "YES", then the flow moves on to block 424 where the blade complex programmable logic device 302 initializes and reads the blade size bits. In block 426, the blade complex programmable logic device 302 writes the bits in the time division multiplex shifty register of the chassis controller using the communication bus 110. The flow then passes on to block 428 where the chassis controller 102 reads the time division multiplex shifty register and determines the blade type. In block 430, the position is incremented to the next slot. In decision block 432, it is determined whether a slave occupies the slot. If the answer to block 432 is "YES", then the flows back up to block 430 where the slot is incremented. If the answer is "NO" to block 432, then the flow moves back up to block 420 and the procedure is repeated again.

Independent of whether the chassis controller detects blade power on or blade power off, the blade inventory process may account for the detection of an insertion of a blade. In the case where the chassis controller has booted up in block 402 blade insertion is monitored in decision block 412, where the chassis controller 102 determines if a blade is inserted in the slot. If the answer in block 412 is "NO", then the chassis controller status remains at block 412 awaiting for a blade insertion event. If the answer in block 412 is "YES", then the flow passes to block 414 where the chassis controller 102 detects a presence signal from the blade slot. In decision block 416, a determination is made whether the blade power of the chassis is powered on. If the answer in block 416 is "YES", then the flow passes to block 410 where the chassis controller reads the blade type from the blade and follows the process flow. If the answer in block 416 is "NO", then the flow passes on to block 420 where the chassis controller 102 provides auxiliary power to newly inserted slot in the blade chassis and follows the process flow.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method of operating an information handling system which comprises a plurality of blade components and a chassis controller, comprising:

obtaining pre-set information handling system limitations;

providing low power auxiliary power to the plurality of blade components within the information handling system;

selectively powering only a portion of at least one of the plurality of blade components in a low power state, the portion of the at least one of the plurality of blade components being sufficient to communicate information regarding a first blade component of the plurality of blade components to a chassis controller;

communicating the first blade component information to the chassis controller while the low power auxiliary power is provided to the first blade;

scanning a multiple of the plurality of blades components while low power auxiliary power is provided to the multiple of the plurality of blade components to identify blade information, the scanning occurring before a power on request to fully power on is provided to a scanned blade;

selectively bypassing the scanning of at least one of the blade components of the information handling system based upon the blade information regarding the information handling system limitations; and terminating the providing of low power auxiliary power to the scanned blade before the request to fully power on the scanned blade is made.

2. The method of claim 1, wherein said method is performed upon detection of an insertion of a new blade in the blade chassis.

3. The method of claim 1, wherein the providing low power auxiliary power step is performed incrementally upon one blade component at a time for a plurality of blade components.

4. The method of claim 1, wherein the blade components are blade servers.

5. The method of claim 1, wherein the information includes at least one of blade type, blade size, blade configuration or number of CPUs within the blade components.

6. The method of claim 1, wherein the selective bypassing is based at least in part upon whether the blade slot is empty.

7. The method of claim 1, wherein the selective bypassing is based at least in part upon whether the blade slot is occupied by a slave blade.

8. The method of claim 1, wherein the selective bypassing is based at least in part upon whether blade slots are empty and whether blade slots are occupied by a slave blade.

9. The method of claim 8, wherein the scanning of the plurality of blade components is performed incrementally.

10. The method of claim 1, wherein the scanning of the plurality of blades is performed incrementally.

11. The method of claim 1, wherein the selective bypassing reduces the power consumption of a blade identification process.

12. The method of claim 11, wherein the providing of low power auxiliary power to the plurality of blade components and the scanning of the plurality of blades is performed incrementally for each blade except for those blades that are selectively bypassed.

13. The method of claim 12, wherein the blade information includes at least one of blade type, blade size, blade configuration or number of CPUs within the blade.

14. The method of claim 1, further comprising a bus coupling the chassis controller and the plurality of blade components wherein the bus provides system hardware control communications in addition to providing blade component information.

15. The method of claim 1, wherein the plurality of blade components and a chassis controller are housed in a blade server chassis, the blade server chassis is capable of being configured in varying dimensions of blade server heights and widths.

* * * * *